(12) United States Patent
Mazyck

(10) Patent No.: US 6,713,423 B2
(45) Date of Patent: Mar. 30, 2004

(54) METHOD FOR REACTIVATING ACTIVATED CARBON AND ACTIVATING CARBON

(75) Inventor: David W. Mazyck, Gainesville, FL (US)

(73) Assignee: Engineering Performance Solutions, LLC, Gainesville, FL (US)

(*) Notice: Subject to any disclaimer, the term of this patent is extended or adjusted under 35 U.S.C. 154(b) by 0 days.

(21) Appl. No.: 10/353,038

(22) Filed: Jan. 29, 2003

(65) Prior Publication Data

US 2004/0009868 A1 Jan. 15, 2004

Related U.S. Application Data

(60) Provisional application No. 60/394,651, filed on Jul. 10, 2002.

(51) Int. Cl.[7] .......................... B01J 38/06; B01J 38/02; C01B 31/08; C01B 31/10
(52) U.S. Cl. .................. 502/55; 423/445 R; 423/447.7; 423/447.8; 502/56
(58) Field of Search .................. 423/445 R, 447.7, 423/447.8; 502/55, 56

(56) References Cited

U.S. PATENT DOCUMENTS 3,852,038 A * 12/1974 Corson ....................... 23/259.9
4,338,198 A * 7/1982 Brown ....................... 210/673
4,957,897 A * 9/1990 Maroldo et al. ............. 502/432
6,206,941 B1 * 3/2001 Du Plessis ..................... 48/111

OTHER PUBLICATIONS

Mazyck et al., "Overcoming calcium catalysis during the thermal reactivation of granular activated carbon Part I. Steam–curing plus ramped–temperature $N_2$ treatment," *Carbon* (2000), 1785–1799.

Mazyck et al., "Overcoming calcium catalysis during the thermal reactivation of granular activated carbon Part II. Variation of steam–curing reactivation parameters," *Carbon* (2000), 241–252.

* cited by examiner

Primary Examiner—Stanley S. Silverman
Assistant Examiner—Jonas N. Strickland
(74) Attorney, Agent, or Firm—Sughrue Mion, PLLC

(57) ABSTRACT

The present invention generally relates to a method of thermally reactivating activated carbon via a two-step process: steam followed by pyrolysis; whereby the steam is preferably deoxygenated. Activated carbons reactivated by this method resemble their virgin counterpart's physical characteristics (e.g., BET surface area) and often perform better in water treatment. The present invention also includes a method of reactivating activated carbon via conventional processes (i.e. pyrolysis followed by steam) at low dissolved oxygen (DO) concentrations. The third aspect of the present invention is the activation of carbonaceous material comprising of steam treating the carbonaceous material followed by pyrolysis.

43 Claims, 3 Drawing Sheets

METHOD FOR REACTIVATING ACTIVATED CARBON AND ACTIVATING CARBON

This application claims the benefit of U.S. Provisional Application No. 60/394,651 filed Jul. 10, 2002, the disclosure of which is herein incorporated by reference.

BACKGROUND OF THE INVENTION

1. Field of the Invention

This invention is directed to a method for activating carbon and thermally reactivating activated carbon and, more particularly, a technique for enhancing the thermal reactivation of activated carbon that once served in water treatment for the removal of taste and odor causing compounds (T&Os; e.g., 2-methylisobomeol and geosmin), volatile organic compounds (VOCs; e.g., benzene, xylenes, and toluene), synthetic organic chemicals (SOCs; e.g., atrazine and lindane), and naturally occurring organic matter (NOM).

2. Description of the Related Prior Art

Activated carbon both in the powdered (PAC) form (generally defined as 90% passing the 325 mesh) and granular (GAC) form (generally defined as passing the 8 mesh, but retained on the 30 mesh or passing the 12 and retained by the 40 mesh) has been used extensively during the past several decades for the removal of unwanted compounds from drinking water. Increase in activated carbon use occurred in the late 1970's upon the U.S. EPA's recommendation of it as being the best available technology (BAT) for controlling trihalomethanes and, later, SOCs in contaminated ground water and drinking water. However, GAC has a finite adsorption capacity, and approaches a point where it cain no longer remove the organics required to purvey aesthetically pleasing water that also meets the EPA's stringent water quality standards.

After GAC has exhausted its finite adsorption capacity or when users deem it necessary, a common practice is to reactivate and return the activated carbon back to service. Typically, spent activated carbon is reactivated in a rotary kiln furnace, but also can be reactivated in fluidized bed or multiple hearth furnaces. Conventional thermal reactivation includes the following steps as discussed by Suzuki et al. "Study of thermal regeneration of spent activated carbons: Thermogravimetric measurement of various single component organics loaded on activated carbons" *Chlem Eng Sci* 1978;33(3):271–279. First, the wet carbon is dried at 105° C. to release water. Second, the GAC is pyrolyzed in a starved gas environment between 650 and 850° C. During pyrolysis, volatile compounds that accumulated during operation are released. This step also causes fragments of adsorbed organic compounds on the GAC surface to form a carbonaceous char. Finally, the adsorbed char is oxidized and gasified by exposing the GAC to $CO_2$, steam, or a combination of both at 650 to 900° C. The inherent limitation of this oxidation step is that it gasifies a fraction of the carbon surface while it is gasifying the char. In other words, some of the carbon is burned during thermal reactivation.

Activated carbon's excellent performance in removing numerous organic compounds has been proven, but it is common to hear the words "activated carbon" and "expensive" in the same sentence. Thermal reactivation can often represent the largest expense associated with using GAC.

Therefore, a method that can reactivate activated carbon that decreases the mass and volume loss, results in a BET surface area or iodine number (as measured by ASTM D4607) near its virgin counterpart, and that lasts longer for removing compounds compared to its virgin counterpart presents an opportunity to decrease the costs associated with thermal reactivation. In other words, if mass loss and volume loss could be decreased during thermal reactivation, then less virgin carbon make-up would be required to replace the carbon lost during reactivation. If the reactivated carbon could stay in service for longer periods of time, then reactivation frequencies would decrease, which would decrease costs because reactivation cycles would be farther apart. Finally, if the reactivated carbon's iodine number and/or BET surface area are close to the virgin counterpart, then the carbon could experience more thermal reactivation cycles. Similarly, a method that improves the efficacy of activated carbon for removing unwanted compounds (such as those listed above) presents an opportunity to improve water treatment.

SUMMARY OF THE INVENTION

Therefore, an object of the present invention is a method for reactivating activated carbon which decreases the mass and volume loss yet results in a BET surface area or iodine number near its virgin counterpart: the reactivated carbon lasting longer for removing compounds compared to conventionally reactivated carbon and, in some instances, its virgin counterpart.

Another object of the present invention is a method for the development of an activated carbon superior in removing unwanted compounds to improve water treatment compared to those that are activated conventionally (i.e., pyrolysis followed by steam).

This object and other objects are achieved by a method for reactivating activated carbon, comprising the steps of steam treating the activated carbon followed by pyrolysis, both the steam treatment and pyrolysis being conducted at a temperature within the range of about 400° C. to about 900° C.

An additional aspect of the invention includes a method for reactivating activated carbon, comprising the steps of pyrolysis followed by steam treating the activated carbon, both the steam treatment and pyrolysis being conducted at a temperature within the range of about 400° C. to about 900° C., wherein the steam treatment comprises treating the activated carbon with steam prepared from water having a dissolved oxygen (DO) content of less than about 9 mg of oxygen per liter of water.

Another aspect of the invention includes a method for activating a carbonaceous material, comprising the steps of steam treating the carbonaceous material followed by pyrolysis.

DETAILED DESCRIPTION OF THE INVENTION

Figure 1:
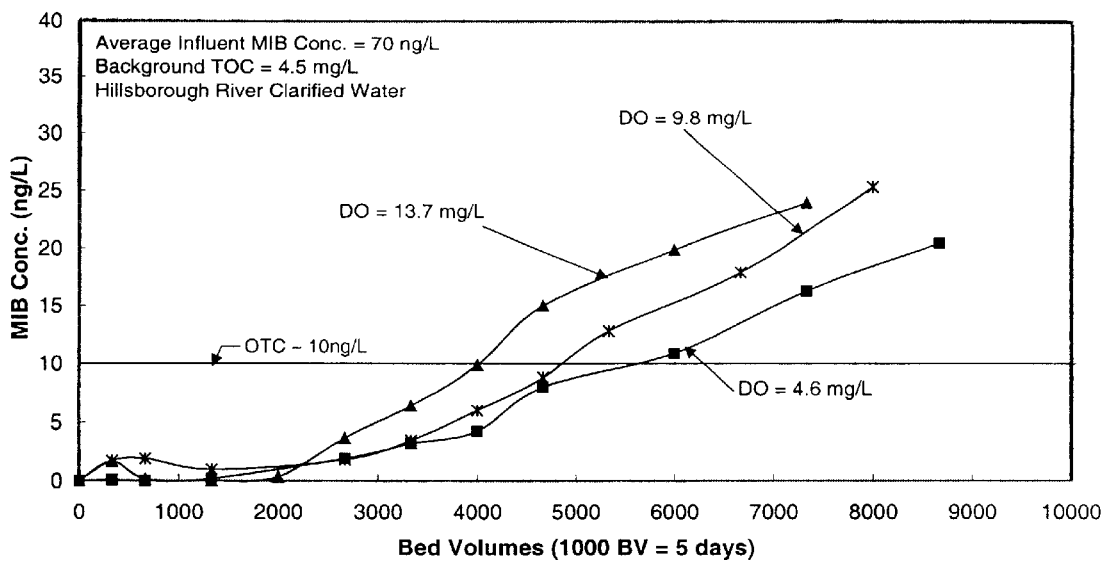
FIG. 1 represents a breakthrough curve comparing conventionally reactivated carbons reactivated with water containing varying dissolved oxygen concentrations in accordance with the present invention.

The present invention includes subjecting activated carbon to a two-step process (herein referred to as steam-pyrolysis) at temperatures equal to or greater than about 400° C. wherein the steam was produced preferably by heating deoxygenated water. As used herein the term pyrolysis refers to heating in an inert/starved gas environment where further deoxygenation/devolatilization can occur. The activated carbon reactivated via this method results in a BET surface area or iodine number near its virgin counterpart, and is capable of processing more bed volumes compared to conventionally reactivated (pyrolysis followed by oxidation) activated carbon. In some cases, this deoxygenated steam-pyrolysis reactivated carbon can outperform its virgin (new) counterpart. In addition, the steam-pyrolysis reactivated carbon results in a lower mass and volume loss compared to conventional reactivation.

The first noticeable difference between the reactivation protocol of the present invention and the conventional reactivation is the reversal of the pyrolysis and oxidation steps. The steam-pyrolysis technique of the present invention employs steam followed by pyrolysis, and this technique is opposite compared to conventional reactivation. While not wishing to be bound by theory, it is believed that by applying steam first, the organics that sorbed during treatment can be oxidized easier through steam gasification rather than first charring the organics through pyrolysis. In addition, completing the reactivation in the pyrolysis step will further remove oxygen functional groups that are deleterious to the removal of the aforementioned organics.

The water gas shift reaction (equation 1 below) is an important reaction that occurs during the thermal reactivation process. This is because it controls the quantity of $H_2$ produced, which anneals carbon reactive sites created from functional decomposition, and thereby prevents subsequent oxidation, which would improve carbon performance.

$$CO + H_2O \leftrightharpoons H_2 + CO_2 \qquad (1)$$

It is further believed that by deoxygenating the water heated for steam that the water gas shift reaction rate would progress to the right more quickly. In addition, by removing the oxygen from water, the only oxidant present in the furnace would be $H_2O$ versus $H_2O$ and liberated oxygen gas. Water can be deoxygenated by any suitable conventional technique in the art including, for example, by bubbling with $N_2$ or by adding chemicals (e.g., sodiumsulfite) to achieve the desired dissolved oxygen level. On the contrary, under some circumstances it may be desirable to supersaturate the steam with oxygen in which case bubbling with pure $O_2$ can increase the water's oxygen content.

In accordance with the general principles of the invention, activated carbon is thermally reactivated in a two-step process of steam treatment followed by pyrolysis in an inert/starved gas atmosphere. The steam treatment and the pyrolysis are both conducted at a temperature of about 400° C. to about 900° C., preferably about 450° C. to about 850° C., most preferably about 650° C. to about 850° C. Preferably, the steam treatment and the pyrolysis are both conducted at the same temperature, but if desired they may be conducted at different temperatures. The steam treatment and the pyrolysis steps may be conducted for as long as desired. Preferably, both steps are conducted for a combined total of about 5 minutes to about 2 hours, more preferably, about 10 to about 60 minutes, most preferably, about 15 minutes to about 30 minutes. The time is preferably split evenly between the steam treatment and pyrolysis steps. Of course, one of ordinary skill in the art will recognize that the time may be apportioned as desired. In one aspect of the invention, at least about half of the time is apportioned to the steam treatment. Further, for the reasons discussed above, the steam used in the steam treatment in accordance with the invention is preferably deoxygenated steam. As used herein, the term "deoxygenated steam" refers to steam prepared by heating water to a temperature of, for example, 105° C. the water having an oxygen content of less than about 9 mg of oxygen per liter of water, preferably less than about 6 mg of oxygen per liter of water, more preferably less than about 5 mg of oxygen per liter of water, and most preferably substantially free of oxygen, i.e., an oxygen content of less than 1 mg of oxygen per liter of water.

In accordance with the present invention, the steam treatment includes subjecting the activated carbon to a flow of steam of at least about 0.01 pounds of steam per pound of carbon, more preferably about 0.05 to about 0.50 pounds of steam per pound of carbon. Further, the pyrolysis may be conducted in any suitable inert (e.g., nitrogen, argon or helium) or starved gas environment (e.g., an environment devoid of oxygen). Other suitable inert, or starved gas, atmospheres will be apparent to one of ordinary skill in the art. Similarly, as one of ordinary skill in the art will recognize, the present invention may be carried out in any suitable conventional apparatus with appropriate accommodation for the reversal of the order of the steam treatment and pyrolysis steps.

It is within the scope of this invention to conventionally reactivate spent carbon using water containing low DO (i.e., water having an oxygen content of less than about 9 mg of oxygen per liter of water, preferably less than about 6 mg of oxygen per liter of water, more preferably less than about 5 mg of oxygen per liter of water, and most preferably substantially free of oxygen, i.e., an oxygen content of less than 1 mg of oxygen per liter of water). In this aspect of the invention, the process conditions including reactivation temperatures and time, as well as the flow rate of steam, would be the same as discussed above in connection with reactivation in which steam treatment is conducted prior to pyrolysis.

Further, it will be recognized that while the present invention has been described in connection with reactivating activated carbon, it is within the scope of the present invention to prepare activated carbon, either powdered or granular, by treating a carbonaceous material in accordance with the method described herein, including the above discussed temperatures, times, flow rates, etc. Examples of carbonaceous material suitable for this aspect of the invention include those that have already experienced pyrolysis/charring (e.g., carbon recovered from coal fired power plant's fly ash and bark char from paper mills, and the like). Other suitable materials would be apparent to one skilled in the art. As mentioned above, under some circumstances it may be desirable to supersaturate the steam with oxygen, for example, as in the context of activating carbon in accordance with the invention, in which case bubbling the water with oxygen can increase the DO concentration to greater than about 10 mg of oxygen per liter of water, more preferably to greater than about 12 mg of oxygen per liter of water. Suitably, the DO concentration may be up to about 30 mg of oxygen per liter of water, or even up to about 100 mg of oxygen per liter of water under some conditions. It will be recognized by one skilled in the art that higher DOs are within the scope of the invention.

The invention will now be described in connection with certain experiments conducted in accordance with the present invention. The experiments are described in the following general discussion as well as in summary form in the following tables and figures.

EXAMPLE 1

Preferably, the pyrolysis and oxidation steps are reversed whereby the spent GAC experiences steam prior to the inert/starved gas environment. However, performance gains are achievable if one uses water that contains low dissolved oxygen water for the steam in the conventional reactivation process. As an example, 10 g of spent GAC was reactivated conventionally at 750° C. for 5 minutes (pyrolysis) followed by 10 minutes of steam (0.2 lb steam/lb carbon), at the same temperature, in a one inch diameter quartz fluidized bed furnace, using water that contained DO of 4.6, 9.8, and 13.7 mg/L. The spent GAC reactivated with the lower DO water processed approximately 2000 more bed volumes to the odor threshold concentration (OTC) compared to that reactivated with water containing higher DO (FIG. 1). The OTC represents the concentration whereby customers can detect (taste or smell) MIB in their water. FIG. 1 also shows that the conventionally reactivated carbon with 9.8 mg/L DO performed similarly to that reactivated with the low DO to about 3200 bed volumes. After 3200 BV, the reactivation with the low DO water performed better.

EXAMPLE 2

In general, in accordance with the present invention, spent GAC was reactivated at 750° C. for 15 minutes in steam (0.2 lbs of steam/lb of carbon) followed by 15 minutes in $N_2$. Its BET surface area was 950 m²/g, which was identical to its virgin counterpart, and considerably greater than the conventionally reactivated activated carbon (750 m²/g). In addition, its mass loss (12.1%) and volume loss (2.3%) were less than the conventionally reactivated carbon (17.3% and 4.1%, respectively). Other temperatures (e.g., 650 and 850° C.) and times (e.g., 5 to 120 minutes) were likewise investigated, and were suitable. The carbons reactivated at 650 and 850° C. had high surface areas (820 and 830 m²/g) compared to the conventional reactivation, but the 850° C. reactivated carbon experienced almost 22% mass loss which under some circumstances might be acceptable. In any event, the process in accordance with the present invention at 750° C. for 15 minutes in deoxygenated steam and 15 minutes of an inert/starved gas environment provided optimal results.

The following table represents a summary of experiments conducted in accordance with the present invention whereby the temperatures for both steps were identical. More specifically, 6 activated carbon samples ("Utilized F300") were collected from 6 water treatment plants, and each sample was reactivated with the present invention in triplicate. The data shown in Table 1 represents an average of these reactivations. In the table, "Virgin F300" is virgin activated carbon available from Calgon Carbon Corporation of Pittsburgh, Pa. The experimental protocol identified as "Conventional Reactivation" included pyrolysis at 850° C. for 5 minutes and oxidation in steam (0.2 lb steam/lb carbon) at 850° C. for 10 minutes. The experimental protocol identified as "Steam Plus Ramped Temperature" included steam treatment at 375° C. (45.8 lb steam/lb carbon) for 1-hr followed by a step in which the temperature was ramped up to 850° C. in an inert/gas starved environment (which took 20 minutes). The remaining experiments were conducted using a protocol in accordance with the present invention, including steam treatment (0.2 lb steam/lb carbon) with deoxygenated steam having an oxygen content of 4–5 mg of oxygen per liter of water followed by pyrolysis in an inert/starved gas environment for a total of 30 minutes (the time being split evenly between the steam treatment and pyrolysis steps), with the temperature being as indicated.

TABLE 1

Comparison of Thermal Reactivation Process Parameters

| Protocol | Percent Mass Loss | Percent Volume Loss | BET Surface Area (m²/g) |
|---|---|---|---|
| Virgin F300 | NA | NA | 950 |
| Utilized F300 | NA | NA | 720 |
| Conventional Reactivation | 17.3 | 4.1 | 750 |
| Steam Plus Ramped Temperature | 15.9 | 3.9 | 830 |
| Steam-Pyrolysis (450° C., 30 minutes) | 5.4 | 0.6 | 780 |
| Steam-Pyrolysis (550° C., 30 minutes) | 5.4 | 0.6 | 750 |
| Steam-Pyrolysis (650° C., 30 minutes) | 10.3 | 2.3 | 820 |
| Steam-Pyrolysis (750° C., 30 minutes) | 12.1 | 2.3 | 950 |
| Steam-Pyrolysis (850° C., 30 minutes) | 21.9 | 2.9 | 830 |

Figure 2:
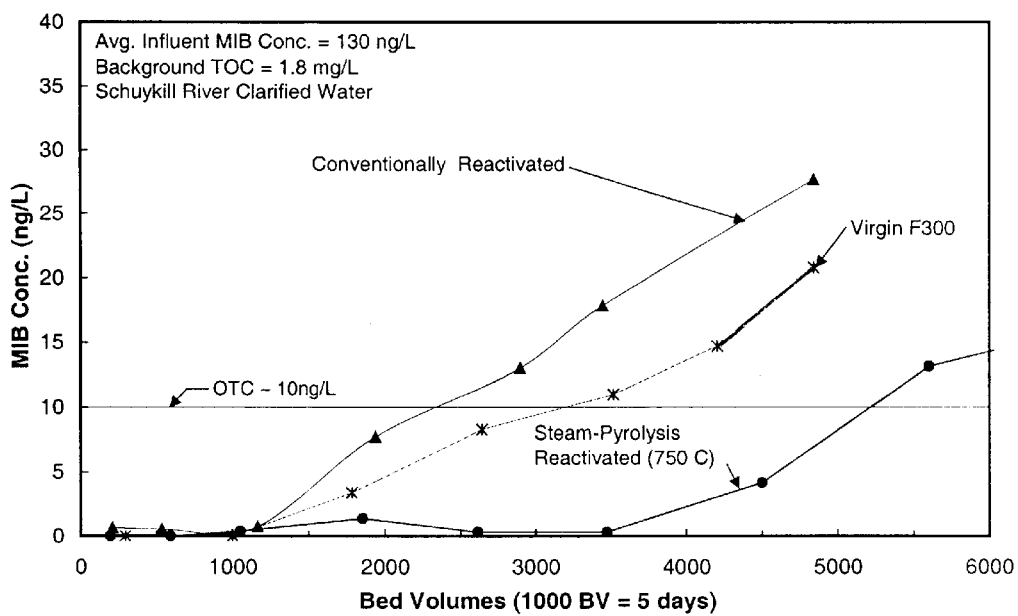
FIG. 2 represents a traditional breakthrough curve comparing conventionally reactivated, virgin, and steam-pyrolysis reactivated carbons prepared in the experiments conducted in accordance with the present invention.

Of importance to the thermal reactivation industry is the performance of the reactivated carbon compared to its virgin counterpart. Therefore, the conventionally reactivated, virgin, and steam-pyrolysis reactivated carbons of Table 1 were compared for their performance in removing the common odorant 2-methylisoborneol (MIB). As illustrated in FIG. 2, the conventionally reactivated carbon experienced breakthrough at approximately 1000 bed volumes, and crossed the odor threshold concentration (OTC) at approximately 2300 bed volumes. The OTC represents the concentration whereby customers can detect (taste or smell) MIB in their water. The virgin carbon likewise broke through at ca. 1000 bed volumes, but did not reach the OTC until ca. 3200 bed volumes. Therefore, the conventionally reactivated carbon had less capacity for MIB than the virgin carbon, and performed worse. The concern that arises is that it is likely that every time this carbon experiences conventional reactivation, its performance is likely to progressively worsen. The steam-pyrolysis reactivated carbon (750° C.) out performed both the conventionally reactivated carbon and its virgin counterpart because the steam-pyrolysis reactivated carbon did not break through until ca. 3500 bed volumes, and did not cross the OTC until 5200 bed volumes.

Figure 3:
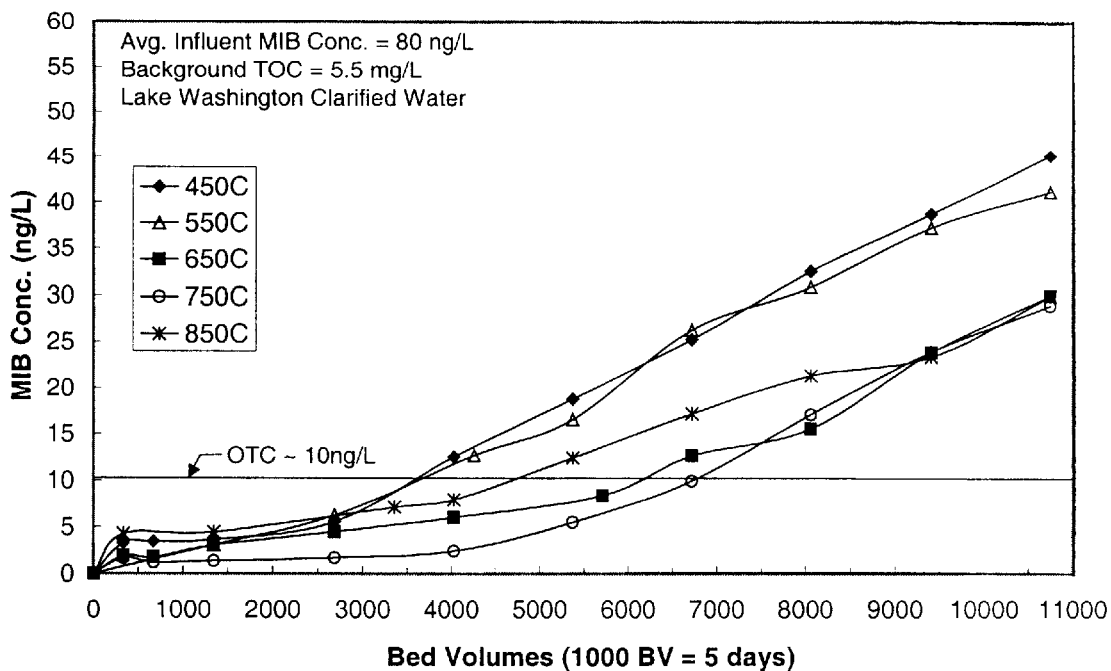
FIG. 3 represents a MIB breakthrough curve for spent GAC reactivated using the present invention at various temperatures (dissolved oxygen=4.5 mg/L) in accordance with the present invention.
Figure 4:
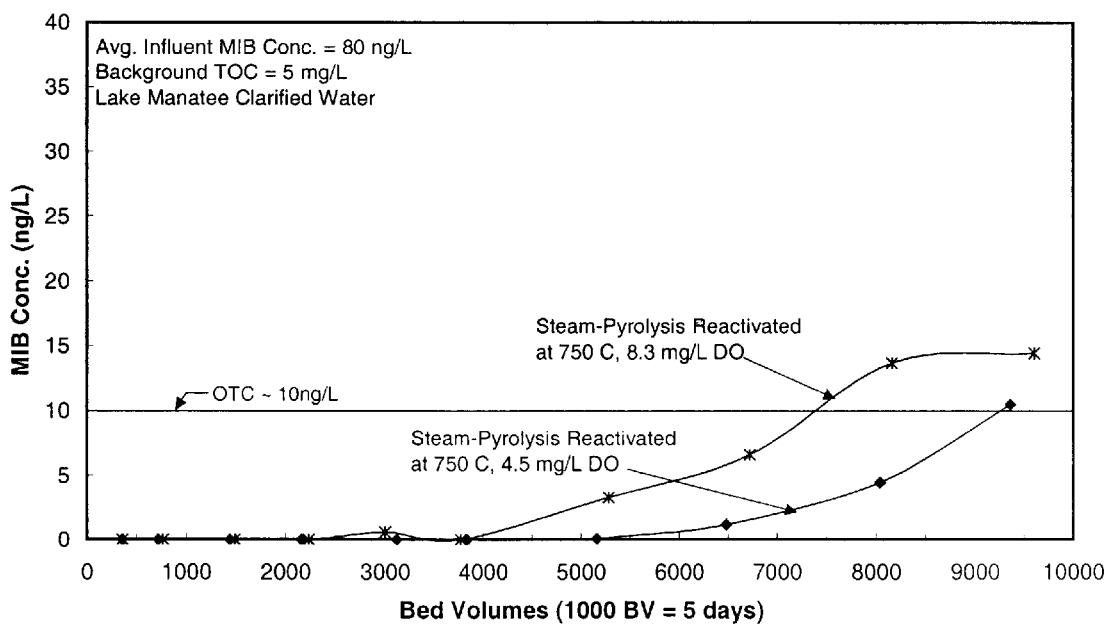
FIG. 4 represents a breakthrough curve comparing spent carbon reactivated at 750° C. for 15 minutes in steam and 15 minutes in an inert/starved gas environment at 2 different dissolved oxygen levels (i.e., 4.5 and 8.3 mgfL) in accordance with the present invention.

In FIG. 3, the greatest volume of water processed before reaching breakthrough and the odor threshold concentration was the steam-pyrolysis reactivated carbon at 750° C. However, this temperature is dependent upon the nature of the adsorbed organics. For example, the reactivated carbons in FIG. 4 were capable of processing more water before breakthrough and surpassing the OTC than those in FIG. 3. For example, the steam-pyrolysis reactivation with the lower DO water did not experience breakthrough until 5000 bed volumes, more than 1000 bed volumes more than the steam-pyrolysis reactivation with the higher DO.

EXAMPLE 3

Figure 5:
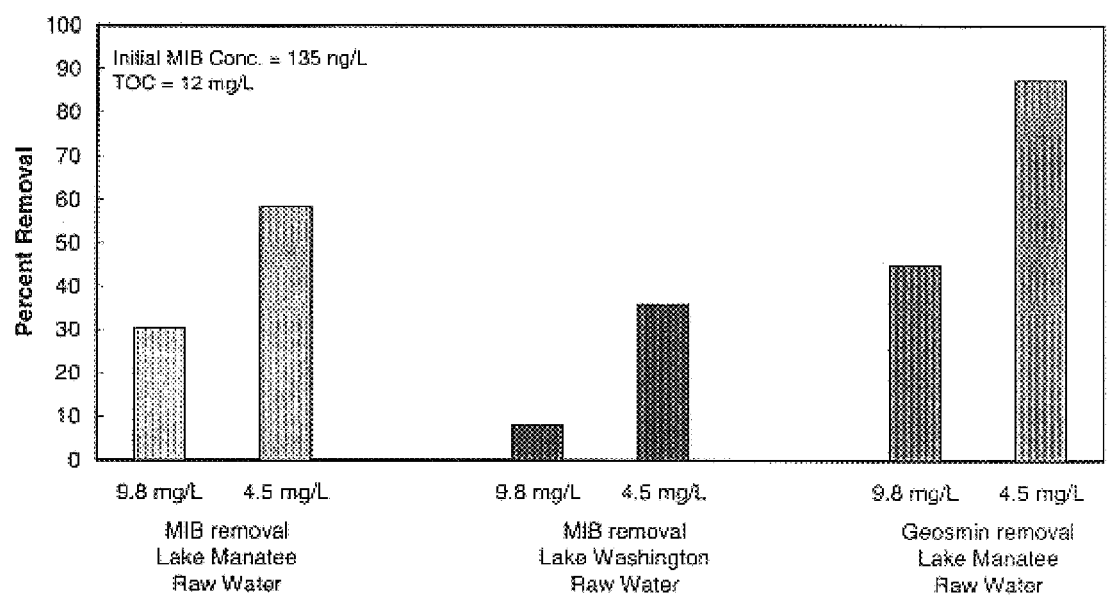
FIG. 5 represents a comparison of a wood-based material activated with two levels of dissolved oxygen (4.5 and 9.8 mg/L) for the removal of T&Os (i.e. MIB and geosmin) in accordance with the present invention.

In accordance with the invention, 3 g of a wood-based material was activated at 850° C. with steam having a DO concentration of 4.5 and 9.8 mg/L followed by pyrolysis at 850° C. for 15 minutes each step. Subsequently, the activated carbons were powdered and tested in batch tests for their ability to either remove MIB or geosmin from two different raw water sources. FIG. 5 demonstrates that the activated carbon, which was activated with steam having been prepared with the water from the lower DO performed better, on a comparison basis, than that which was activated with steam having the higher DO (i.e., 9.8 mg/L), both results (i.e., 4.5 and 9.8 mg/L) being favorable/acceptable.

There are no other known inventions whereby activated carbons are thermally reactivated such that the reactivated carbon resembles its virgin counterpart with respect to physical properties and performance. There are no other known inventions where the steam is deoxygenated for either activation or reactivation.

Water utilities that employ activated carbon must routinely face the costs and operational challenges associated with removing and replacing carbon that has lost its capacity for removing contaminants. The invention described herein would facilitate the water utilities to reactivate their carbon less frequently.

Although the present application has been described in connection with the preferred embodiments thereof, many other variations and modifications will become apparent to those skilled in the art without departure from the scope of the invention.

What is claimed is:

1. A method for reactivating activated carbon, comprising the steps of steam treating the activated carbon followed by pyrolysis, both the steam treatment and pyrolysis being conducted at a temperature within the range of about 400° C. to about 900° C., wherein the steam treatment comprises treating the activated carbon with steam prepared from water having a dissolved oxygen content of less than about 9 mg of oxygen per liter of water.

2. The method according to claim 1, wherein both the steam treatment and pyrolysis are conducted at a temperature within the range of about 450° C. to about 850° C.

3. The method according to claim 2, wherein both the steam treatment and pyrolysis are conducted at a temperature within the range of about 650° C. to about 850° C.

4. The method according to claim 3, wherein both the steam treatment and pyrolysis are conducted at the same temperature.

5. The method according to claim 1, wherein both the steam treatment and pyrolysis are conducted for a total of about 5 minutes to about 2 hours.

6. The method according to claim 5, wherein both the steam treatment and pyrolysis are conducted for about 10 minutes to about 60 minutes.

7. The method according to claim 5, wherein the steam treatment and pyrolysis are conducted for equal amounts of time.

8. The method according to claim 1, wherein the steam treatment comprises treating the activated carbon with steam prepared from water having a dissolved oxygen content of less than about 6 mg of oxygen per liter of water.

9. The method according to claim 9, wherein the steam treatment comprises treating the activated carbon with steam prepared from water having a dissolved oxygen content of less than about 5 mg of oxygen per liter of water.

10. The method according to claim 9, wherein the steam treatment comprises treating the activated carbon with steam prepared from water having a dissolved oxygen content of less than 1 mg of oxygen per liter of water.

11. The method according to claim 1, wherein the steam treatment comprises subjecting the activated carbon to a flow of steam of at least about 0.01 pounds of steam per pound of activated carbon.

12. The method according to claim 11, wherein the steam treatment comprises subjecting the activated carbon to a flow of steam of about 0.05 to about 0.50 pounds of steam per pound of activated carbon.

13. A method for reactivating activated carbon, comprising the steps of pyrolysis followed by steam treating the activated carbon, both the steam treatment and pyrolysis being conducted at a temperature within the range of about 400° C. to about 900° C., wherein the steam treatment comprises treating the activated carbon with steam prepared from water having a dissolved oxygen content of less than about 9 mg of oxygen per liter of water.

14. A method according to claim 13, wherein the steam treatment comprises treating the activated carbon with steam prepared from water having a dissolved oxygen content of less than about 6 mg of oxygen per liter of water.

15. A method according to claim 14, wherein the steam treatment comprises treating the activated carbon with steam prepared from water having a dissolved oxygen content of less than about 5 mg of oxygen per liter of water.

16. A method according to claim 15, wherein the steam treatment comprises treating the activated carbon with steam prepared from water having a dissolved oxygen content of less than about 1 mg of oxygen per liter of water.

17. The method according to claim 13, wherein the steam treatment comprises subjecting the activated carbon to a flow of steam of at least about 0.01 pounds of steam per pound of activated carbon.

18. The method according to claim 17, wherein the steam treatment comprises subjecting the activated carbon to a flow of steam of about 0.05 to about 0.50 pounds of steam per pound of activated carbon.

19. The method according to claim 13, wherein both the steam treatment and pyrolysis are conducted at a temperature within the range of about 450° C. to about 850° C.

20. The method according to claim 19, wherein both the steam treatment and pyrolysis are conducted at a temperature within the range of about 650° C. to about 850° C.

21. The method according to claim 19, wherein both the steam treatment and pyrolysis are conducted at the same temperature.

22. The method according to claim 13, wherein both the steam treatment and pyrolysis are conducted for a combined total of about 5 minutes to about 2 hours.

23. The method according to claim 22, wherein both the steam treatment and pyrolysis are conducted for a combined total of about 10 minutes to about 60 minutes.

24. The method according to claim 23, wherein the steam treatment and pyrolysis are conducted for equal amounts of time.

25. A method for activating a carbonaceous material, comprising the steps of steam treating the carbonaceous material followed by pyrolysis, wherein the steam treating comprises subjecting the carbonaceous material to steam prepared from water having a dissolved oxygen content of less than about 9 mg of oxygen per liter of water.

26. The method according to claim 25, wherein the steam treating comprises subjecting the carbonaceous material to steam prepared from water having a dissolved oxygen content of less than about 6 mg of oxygen per liter of water.

27. The method according to claim 26, wherein the steam treating comprises subjecting the carbonaceous material to steam prepared from water having a dissolved oxygen content of less than about 5 mg of oxygen per liter of water.

28. The method according to claim 27, wherein the steam treating comprises subjecting the carbonaceous material to steam prepared from water having a dissolved oxygen content of less than about 1 mg of oxygen per liter of water.

29. The method according to claim 25, wherein the steam treatment comprises subjecting the carbonaceous material to a flow of steam of at least about 0.01 pounds of steam per pound of carbonaceous material.

30. The method according to claim 29, wherein the steam treatment comprises subjecting the carbonaceous material to a flow of steam of about 0.05 to about 0.50 pounds of steam per pound of carbonaceous material.

31. The method according to claim 25, wherein both the steam treatment and pyrolysis are conducted at a temperature within the range of about 400° C. to about 900° C.

32. The method according to claim 31, wherein both the steam treatment and pyrolysis are conducted at a temperature within the range of about 450° C. to about 850° C.

33. The method according to claim 32, wherein both the steam treatment and pyrolysis are conducted at a temperature within the range of about 650° C. to about 850° C.

34. The method according to claim 31, wherein both the steam treatment and pyrolysis are conducted at the same temperature.

35. The method according to claim 25, wherein both the steam treatment and pyrolysis are conducted for a total of about 5 minutes to about 2 hours.

36. The method according to claim 35, wherein both the steam treatment and pyrolysis are conducted for about 10 minutes to about 60 minutes.

37. The method according to claim 36, wherein the steam treatment and pyrolysis are conducted for equal amounts of time.

38. The method according to claim 25, wherein the steam treating comprises subjecting the carbonaceous material to steam prepared from water having a dissolved oxygen content of greater than about 10 mg of oxygen per liter of water.

39. The method according to claim 38, wherein the steam treating comprises subjecting the carbonaceous material to steam prepared from water having a dissolved oxygen content of greater than about 12 mg of oxygen per liter of water.

40. A method for reactivating activated carbon, comprising the steps of steam treating the activated carbon followed by pyrolysis, both the steam treatment and pyrolysis being conducted at a temperature within the range of about 650° C. to about 850° C. for about 10 to about 60 minutes, wherein the steam treatment comprises treating the activated carbon with steam prepared from water having a dissolved oxygen content of less than about 9 mg of oxygen per liter of water.

41. The method according to claim 40, wherein the steam is prepared from water having a dissolved oxygen content of less than about 6 mg of oxygen per liter of water.

42. The method according to claim 41, wherein the steam is prepared from water having a dissolved oxygen content of less than about 5 mg of oxygen per liter of water.

43. The method according to claim 42, wherein the steam is prepared from water having a dissolved oxygen content of less than about 1 mg of oxygen per liter of water.

* * * * *